INVENTOR
JOHN J. NASH
BY
ATTORNEY

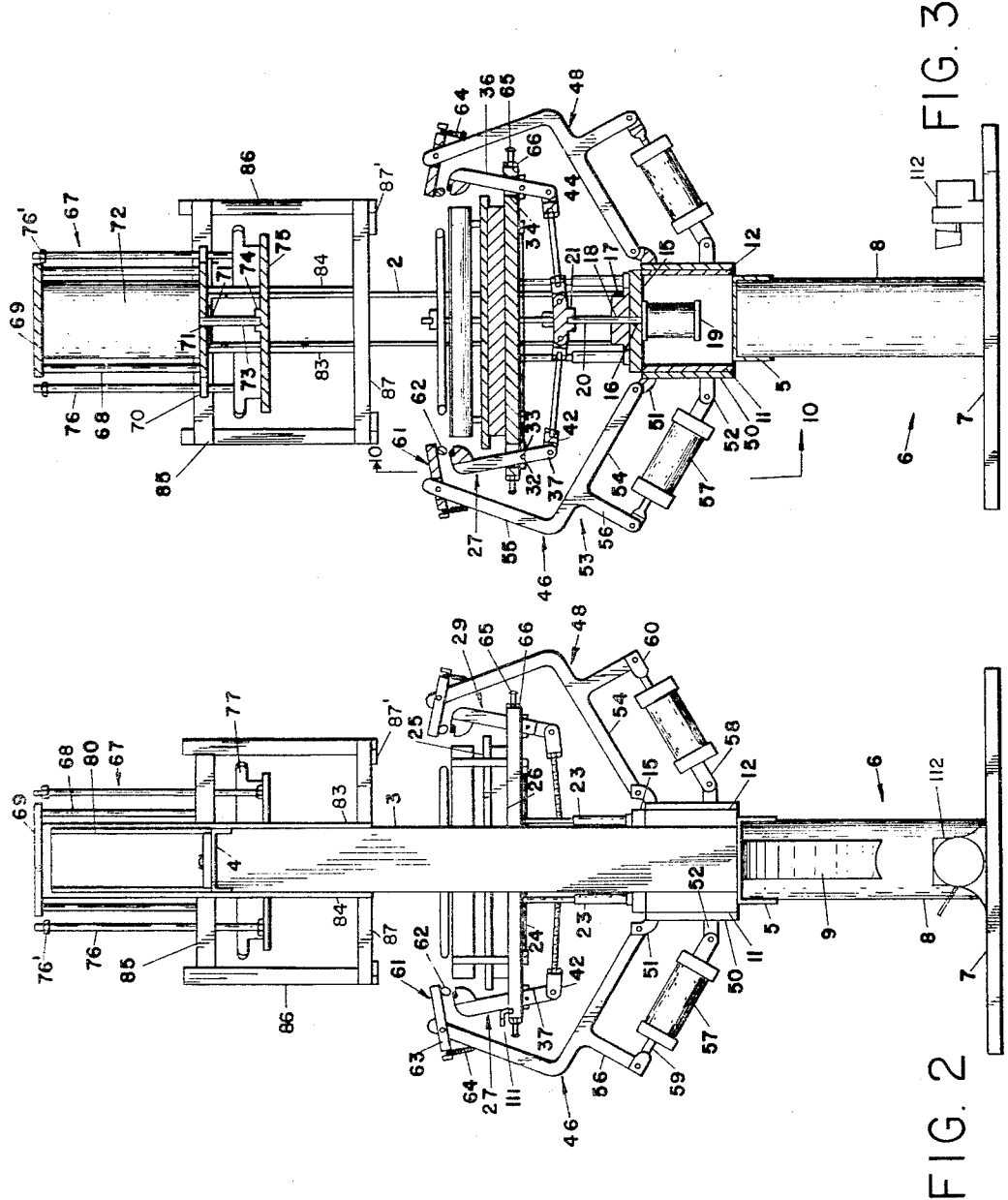
FIG. 3
FIG. 2
INVENTOR
JOHN J. NASH
BY 
ATTORNEY

INVENTOR
JOHN J. NASH

ATTORNEY

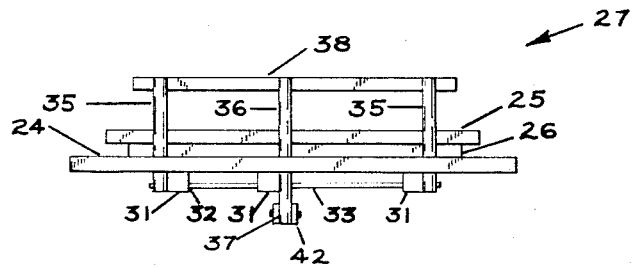
FIG. 10
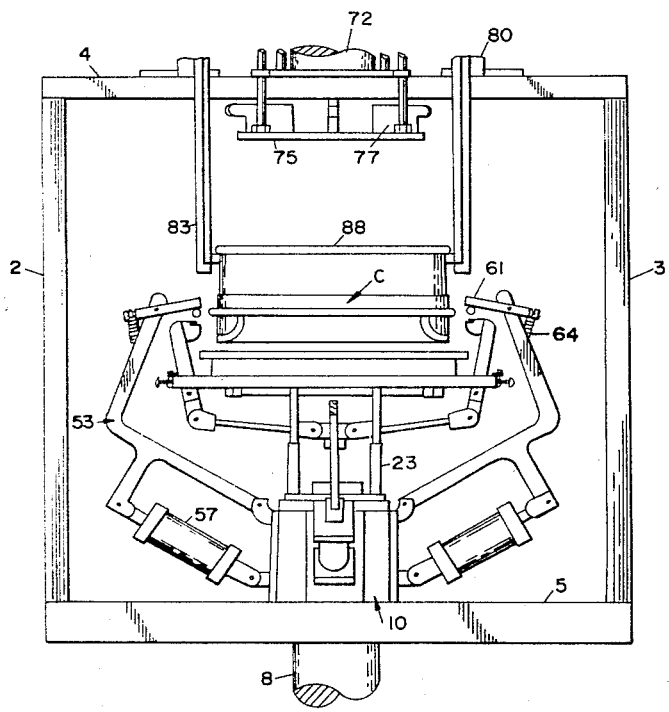
FIG. 11
INVENTOR
JOHN J. NASH
BY 
ATTORNEY

INVENTOR
JOHN J. NASH

United States Patent Office 3,438,108
Patented Apr. 15, 1969

3,438,108
APPARATUS FOR ASSEMBLING AND SECURING COMPONENTS OF A FURNITURE CUSHION
John J. Nash, Ferguson, Mo., assignor to Alsco, Inc., St. Louis, Mo., a corporation of Delaware
Filed July 25, 1966, Ser. No. 567,458
Int. Cl. B68g 7/05
U.S. Cl. 29—91.5       11 Claims

ABSTRACT OF THE DISCLOSURE

Apparatus for assembling and securing components of a furniture cushion, said cushion including a rigid base member, resilient means and a cavity-forming cover section sized and shaped to hold the resilient means and base member together in a unitary structure. The assembling device comprises a frame, a platen support carried by the frame for supporting the cover section with the resilient means and base member therein, a press assembly carried by the frame in outwardly spaced relation to the platen for engaging the base member and urging it into the cover section to compress the resilient means, the press assembly including a pressure plate above the platen adapted to move into and away from engagement with the base member, a shell sized for insertion in the cover section for holding it in relation to the resilient means and base member while the press assembly compresses the resilient means and urges the base member into the cover section, and securing means for securing the cover section to the base member after the press assembly compresses the resilient means within the cover section, said securing means including a plurality of wiper bars carried by the frame for engaging an outwardly projecting portion of the cover section and pressing it firmly against the base member so that the cover section and base member can be adhered together by an adhesive.

---

This invention relates to a device for assembling furniture cushions from component parts such as springs, batting, cover sections, and base members.

Cushions for modern office furniture such as swivel chairs, conventional chairs, and the like, generally comprise a base fabricated from steel, wood or some other rigid material on which a set of burlap-covered springs is supported. Often a piece of felt is interposed between the burlap-covered springs and the base. The set of springs is generally covered with a mat of rubber-bonded hair and over that is placed a sheet of cotton or other suitable batting, the batting extending downwardly so as to cover the sides of the set of springs. Finally, the cushion is upholstered with attractive synthetic resin or other suitable fabric cover section which completely covers the batting, mat and springs. The cover section generally is adhesively bonded or otherwise secured to the underside of the base whereby to hold the spring, batting and mat in place in the formation of an attractive seat cushion.

Unless the fabric cover section is drawn tightly over the internal parts of the cushion or in other words is tightly stuffed the fabric will tend to wrinkle or crease which not only distracts from its appearance, but also shortens its life. Since many cushions are presently stuffed by hand, a tightly stuffed cushion is difficult to produce. Moreover, hand stuffing consumes considerable time and is expensive for it is difficult for one person to completely assemble a cushion. In this connection it has been found that hand stuffing of such cushions consumes from 15 to 20 minutes and is, therefore, indeed costly.

Among the several objects of the present invention may be noted the provision of a device for assembling furniture cushions from component parts which assembles such cushions rapidly and with a minimum expenditure of manual labor; the provision of a device of the type stated which is easy and safe to operate, simple and rugged in construction, and economical to manufacture; and the provision of a device of the type stated which performs the successive steps associated with furniture cushion assembly automatically. Other objects and features will be in part apparent and in part pointed out hereinafter.

The invention accordingly comprises the constructions hereinafter described, the scope of the invention being indicated in the following claims.

In the accompanying drawings in which a preferred embodiment of the invention is illustrated, FIG. 1 is a front elevational view of a cushion-assembling device constructed in accordance with and embodying the present invention;

FIG. 2 is a side elevational view of the cushion-assembling device;

FIG. 3 is a sectional view taken along line 3—3 of FIG. 1;

Figure 1:
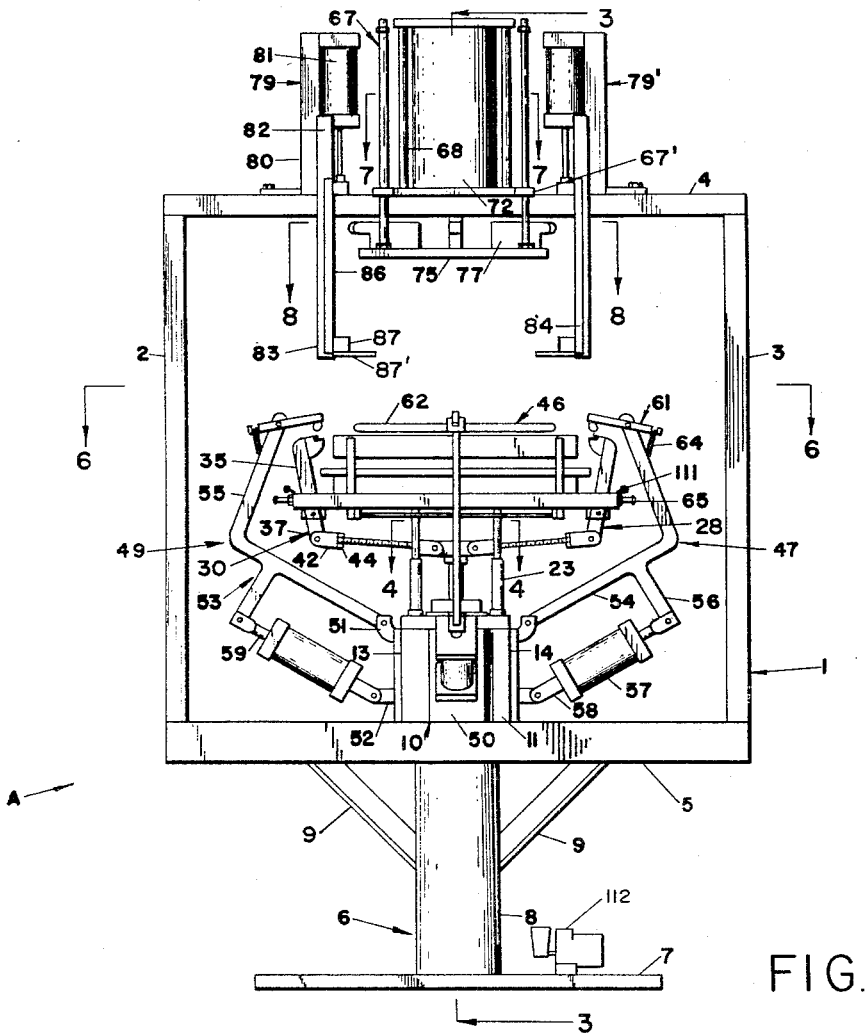
Figure 7:
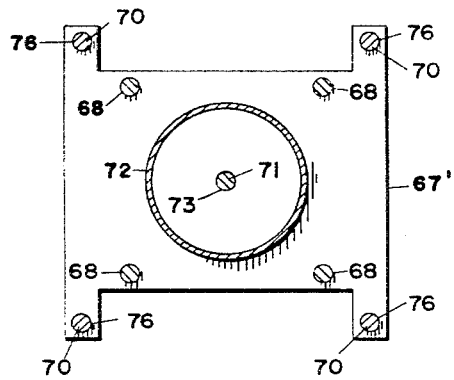
Figure 9:
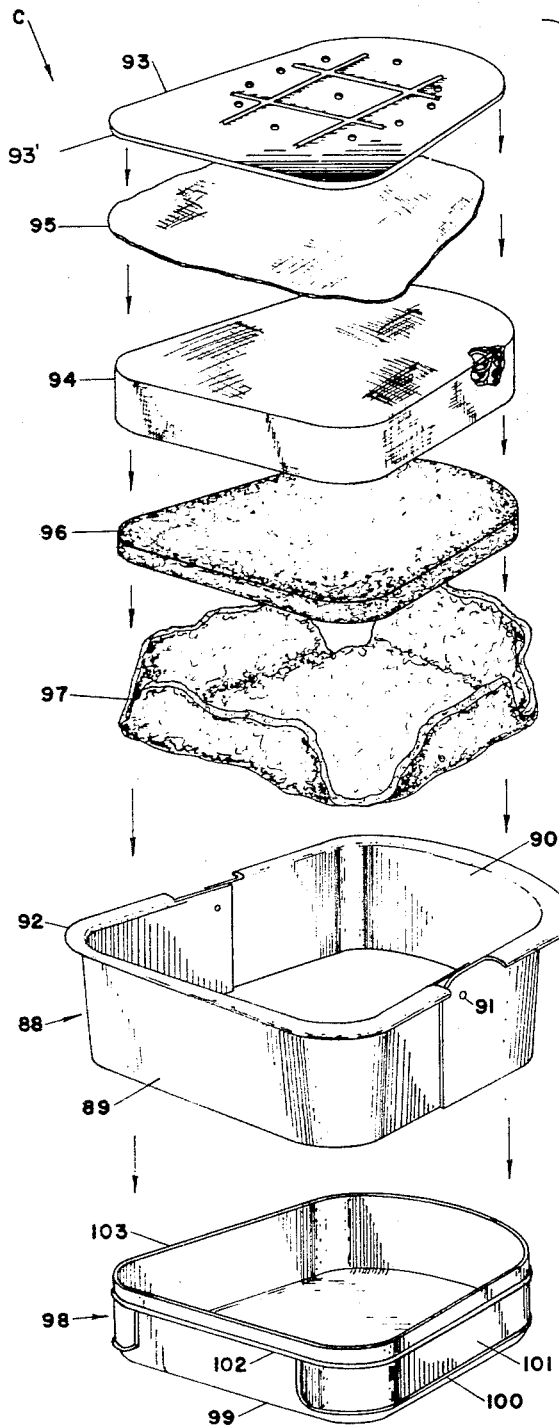
Figure 4:
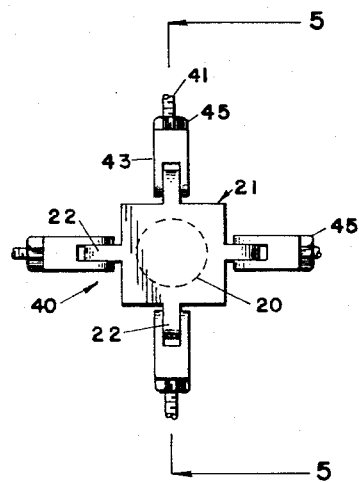
FIG. 4 is a fragmentary sectional view taken along line 4—4 of FIG. 1.
Figure 5:
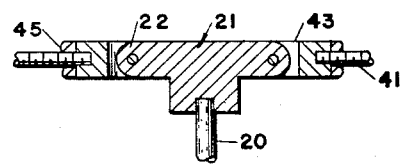
FIG. 5 is a fragmentary sectional view taken along line 5—5 of FIG. 4.
Figure 6:
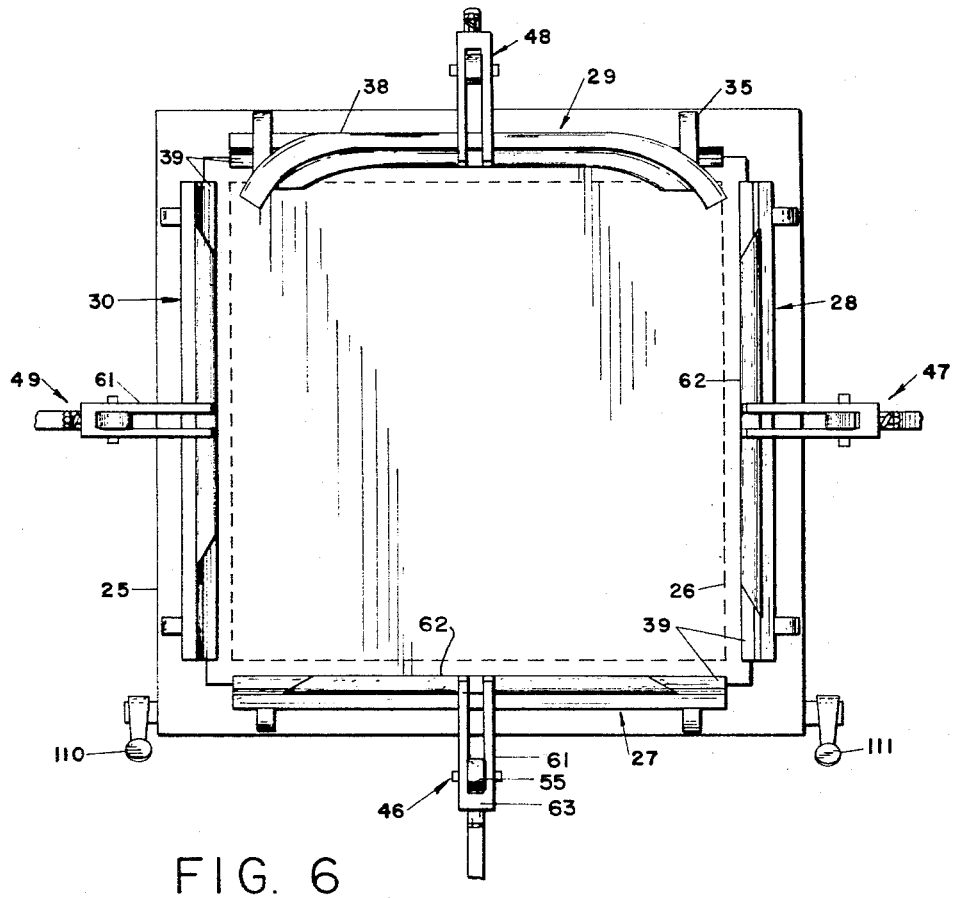
Figure 8:
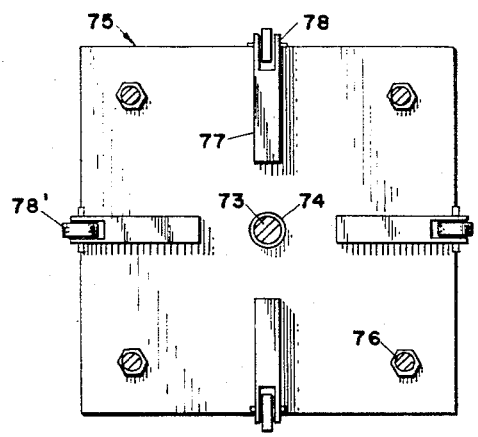
Figure 12:
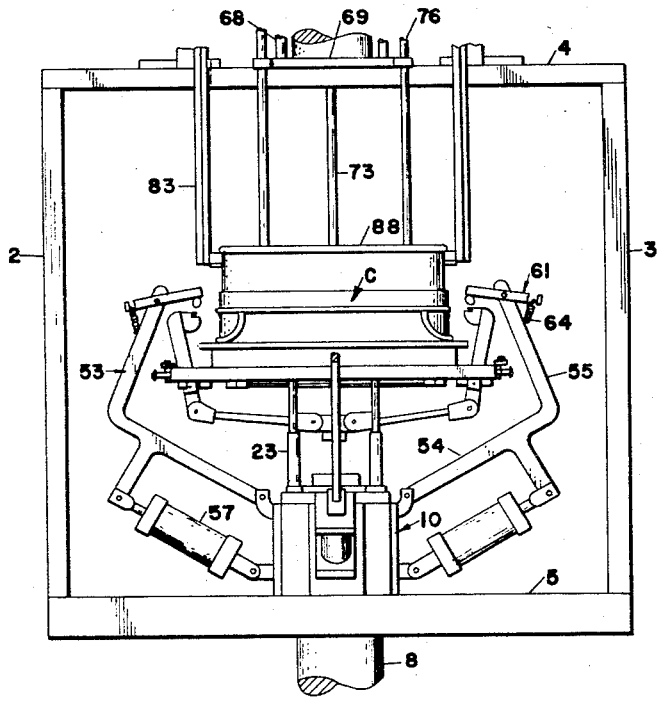
Figure 13:
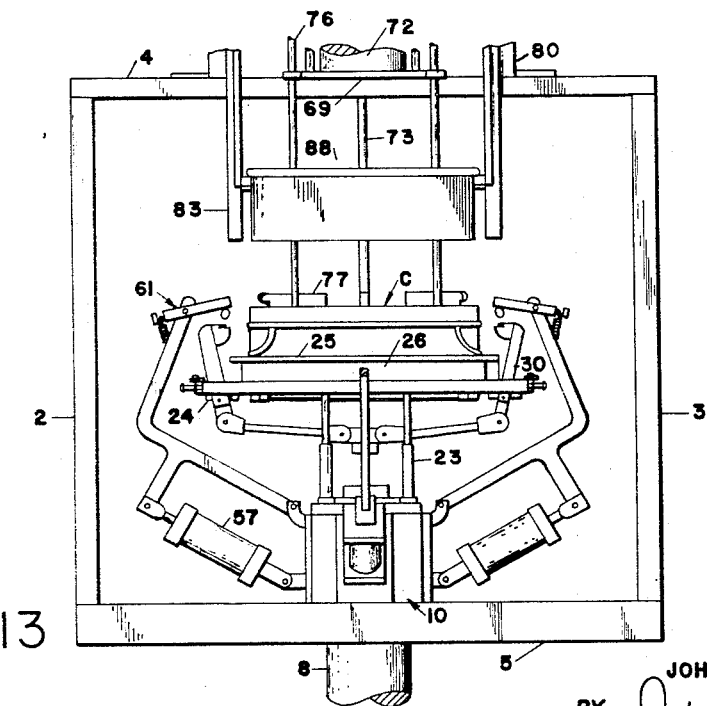

FIGS. 6, 7, and 8 are sectional views taken along lines 6—6, 7—7, and 8—8, respectively, of FIG. 1;

FIG. 9 is an exploded perspective view of a seat cushion adapted for assembly in the present invention and additionally showing an assembling shell forming part of the present invention;

FIG. 10 is a sectional view taken along line 10—10 of FIG. 3; and

FIGS. 11 through 15 are fragmentary front elevational views sequentially showing the assembly steps performed by the present invention.

Corresponding reference characters indicate corresponding parts throughout the several views of the drawings.

Referring now in more detail and by reference characters to the drawings which illustrate a preferred embodiment of the present invention, A designates a device for assembling cushions including a rectilinear frame 1 having spaced parallel vertical side channels, 2, 3, which are transversely connected by upper and lower horizontal channels 4, 5, respectively. Frame 1 is supported on a pedestal 6 including a flat base plate 7 and an upstanding tubular support member 8. At its lower end, the support member 8 is welded or otherwise secured to the center of the base plate 7 and at its upper end it is welded to the center of the underface of the web channel 5. Angularly welded to the sides of support member 8 and to the underface of the web of channel 5 and extending therebetween are gussets 9 which lend rigidity to the structure.

Centrally disposed on and secured to the upper face of channel 5 is a rectilinear box-like housing 10 having upstanding end walls 11, 12, which are transversely connected by side walls 13, 14, the latter being welded along their bottom margins to the upper face of channel 5. Bolted to the upper margins of walls 11, 12, 13, 14, is a top plate 15 which is centrally provided with an aperture 16. Bolted to the upper face of plate 15 is a guide block 17 having an aperture 18 which registers with aperture 16. Similarly bolted to the underface of plate 15 is a double-acting pneumatic cylinder 19 provided with an extensible piston rod 20 which projects through axially aligned apertures 16, 18, the latter of which serves as a guide therefor, and beyond the upper face of guide block 17 where it is rigidly provided with a hub 21 having four equally spaced radially projecting spokes 22. Since pneumatic cylinder 19 is conventional in design, it will not be described or illustrated in further detail herein.

Rigidly secured to and projecting upwardly from plate 15 near each corner thereof are tubular support legs 23 which support a flat rectangular work-supporting plate 24 in upwardly spaced relation to plate 15 and channel 5. Centrally disposed over the upper face of plate 24 is a removable wood or synthetic resin platen 25 adapted for facewise contact with the fabric upholstery material. Interposed between platen 25 and plate 24 is a spacer element 26.

Operatively mounted on plate 24 in close proximity to the side and end margins thereof are four upholstery-engaging assemblies 27, 28, 29, and 30. Since each of upholstery-engaging assemblies 27, 28, 29, and 30, is identical in design and operation, only upholstery-engaging assembly 27 will be described in detail herein. Assembly 27 includes three support blocks 31 which are welded to the underface of plate 24 in inwardly spaced relation to the front end margin thereof, reference being made to the left side as seen in FIG. 3. Blocks 31 are provided with axially aligned apertures 32 which are fitted with an axle 33, axle 33 being in spaced parallel relation to the underface and the front end margin of plate 24. Plate 24 is provided in close proximity to blocks 31 with three elongated apertures 34, the longitudinal axes of which are in spaced perpendicular relation to the axis of axle 33. Journaled on each end of axle 33 and projecting upwardly through apertures 34 are end swing bars 35. Interposed between end swing bars 35 and similarly journaled on axle 33 is a center swing bar 36 which also extends upwardly and passes through the center of elongated apertures 34. Center swing bar 36, however, differs from end swing bars 35 in that it extends below axle 33 in the provision of a lever arm 37. Bolted or otherwise rigidly fastened to the inwardly presented upper ends of bars 35, 36, is a horizontal upholstery-engaging cross bar 38 provided with an upwardly and inwardly presented longitudinally extending bead-engaging groove 39. Thus cross bar 38 can swing inwardly and outwardly on swing arms 35, 36.

Interconnecting lever arm 37 of arm 36 and one of spokes 22 fastened to piston rod 20 is an adjustable linkage 40 having a shank 41 which is oppositely threaded from each end, that is, provided with a left hand thread on one end and a right hand thread on its other end. Threaded over the ends of shank 41 are clevises 42, 43, which are prevented from rotating with respect thereto by jamb nuts 44, 45, respectively. The yoke-forming portion of clevis 42 is pinned to lever arm 37 while the yoke-forming portion of clevis 43 is pinned to a spoke 22 of hub 21. Thus, as piston rod 20 moves up linkages 40 will move from an angulated position to a horizontal position thereby forcing lever arm 37 outwardly and cross bar 38 inwardly.

The particular cushion assembled by the preferred embodiment of the present invention possesses straight front and side margins and an arcuate rear margin. Accordingly, as will be seen by reference to FIG. 6, one of cross bars 38, namely the bar 38 of upholstery-engaging assembly 29, is curved to conform to the contour of the cushion. To provide end support for such bars 38, the upper ends of end swing bars 35 are extended forwardly. It will be understood, however, that the degree of curvature of cross bars 38 or whether or not such cross bars are curved at all is a design feature dictated by the peripheral contour of the cushion to be assembled.

Swingably fastened to walls 11, 12, 13, and 14 of boxlike housing 10 are wiper assemblies 46, 47, 48, and 49, respectively. Since wiper assemblies 46, 47, 48, and 49 are identical in construction and operation only wiper assembly 47 will be described in detail herein. Wiper assembly 47 includes a mounting plate 50 which is bolted to the outer face of end wall 11 and is provided on its outwardly presented face with a bifurcated bracket 51 and a tab 52. Swingably pinned on bifurcated bracket 51 is an angulated arm 53 integrally comprising a lower leg 54 and an upper leg 55, the latter being canted with respect to the former. Lower leg 54 integrally includes a downwardly projecting ear 56. Interposed between ear 56 of arm 53 and tab 52 of mounting plate 50 is a double-acting pneumatic cylinder 57 having a bifurcated bracket 58 rigidly fastened to one end, bracket 58 being pinned to tab 52 whereby to swingably mount hydraulic cylinder 57 on mounting plate 50. At its other end pneumatic cylinder 57 is provided with an extensible piston rod 59 and threaded thereon is a clevis 60 which is pinned to ear 56. Pneumatic cylinder 57, being conventional in design and manufacture, is not described or illustrated herein in further detail.

Pinned on the upper end of leg 55 and extending inwardly over the work-supporting plate as well as outwardly beyond the outer margins of leg 55 is a bifurcated wiper arm 61. As will be seen by reference to FIG. 6, leg 55 is interposed between the furcations of wiper arm 61 and the two are confined to rotation in the same plane about their respective pins. At its inwardly presented end, that is, the end toward the platen 25, wiper arm 61 is provided on its underface with a wiper bar 62 of somewhat elliptical cross-sectional shape, wiper bar 62 being always parallel to the upwardly presented face of plate 24. At its opposite end, wiper arm 61 is provided with a connecting member 63, the lower inwardly presented margin of which serves as an abutment face and limits the arc through which arm 61 can swing. Conventionally fastened to the outer face of connecting member 63 and the outer margins of upper leg 55 is a tension spring 64 which normally biases connecting member 63 against leg 55 so as to hold wiper bar 62 in the upper extremity of the arc through which it is capable of moving. As air is forced in pneumatic cylinder 57, piston rod 59 extends, rotating angulated arm 53 about its pin in bifurcated bracket 51 and presenting the wiper bar over platen 25. Threaded within the end and side margins of work-supporting plate 24 are limit bolts 65 which are adapted to abut against the inner margins of legs 55 and limit the inward travel of arms 53 of wiper assemblies 46, 47, 48, 49. Limit bolts 65 are provided with jamb nuts 66 and can be adjusted to any desired length.

Again referring to FIG. 6, it will be further noted that wiper bars 62 of wiper assemblies 46, 47, and 49 are straight, whereas wiper bar 62 of wiper assembly 48 is arcuate. As was true of cross bars 38 of upholstery-engaging assemblies 27, 28, 29, 30, the particular curvature of each wiper bar 62 is dictated by the contour of the cushion.

Operatively mounted on frame 1 is press-assembly 67 including a horizontal support frame 67' which is welded to the upper face of channel 5. Rigidly fastened to frame 67' at one end are upstanding rods 68 which are bolted or otherwise fastened at their other ends to an upper frame 69, frame 69 being supported in upwardly spaced parallel relation to frame 67'. Inwardly from rods 68, support frame 67' is provided with a plurality of apertures 70 and further is centrally provided with an aperture 71 which registers with an aperture 71' in channel 4. Interposed between frames 67', 69, is a conventional double-acting pneumatic cylinder 72 having an extensible piston rod 73 which projects through apertures 71, 71', for movement to and from platen 25. Rods 68, in effect, are tension rods which urge frames 67', 69, toward one another whereby to rigidly hold cylinder 72 therebetween. Cylinder 72, being conventional in design and manufacture, is, therefore, not described or illustrated herein in greater detail.

Rigidly fastened to the lower end of piston rod 73 is a sleeve 74 which is perpendicularly welded to a flat rectangular pressure plate 75. Near its corners pressure plate 75 is provided with upstanding guide rods 76 which extend through and fit slidably within apertures 70 of frame 67' and prevent pressure plate 75 from rotating with respect to work-supporting plate 24. Thus, the margins of pressure plate 75 are always parallel to the margins of work-supporting plate 24 as well as wiper bars 62 and bead-engaging grooves 39 of cross bars 38. At their upper ends guide rods 76 are threaded and fitted wtih stop nuts 76' for limiting and accurately controlling the downward extension of pressure plate 75.

Welded to the upper face of pressure plate 75 are camming blocks 77 having bifurcated ears 78 which project outwardly over the center of each side margin thereof. Bifurcated ears 78 are provided with rollers 78' which are pinned therein and adapted to roll against upper camming surfaces of bifurcated wiper arms 61 when wiper assemblies 46, 47, 48, 49, are activated.

Referring again to FIG. 1, it will be seen that upper channel 4 additionally mounts two shell-lifting assemblies 79, 79', which are operatively mounted on each side of press assembly 67, but are otherwise identical in construction and operation. Therefore, only shell-lifting assembly 79 will be described herein in detail. Shell-lifting assembly 79 includes an upstanding channel 80 which is perpendicularly welded or otherwise fastened to the upper face of channel 4. Bolted to the inwardly presented face of channel 80 is a conventional double-acting pneumatic cylinder 81 having an extensible piston rod 82 mounted therein for movement along a vertical axis. Bolted to the side flanges of channel 4 are projecting both upwardly and downwardly therefrom are vertical spaced parallel guide rails 83, 84. The lower end of piston rod 82 is centrally secured to a horizontal bar 85 which is rigidly provided at each end with spaced parallel depending connector bars 86. The lower ends of connector bars 86 are transversely connected by an inwardly projecting shell-lifting bar 87 which is provided at its rearmost end with an inwardly projecting stop tab 87'. As will be noted by reference to FIG. 1, the outwardly presented or back surface of bars 85, 87, slidably bear against guide rails 83, 84. The height of shell-lifting bar 87 is thus controlled by pneumatic cylinder 81 and it should be noted that when piston rod 82 is fully extended horizontal bar 85 bears against the upper surface of channel 4 thereby serving as a stop.

Shell-lifting bars 87 of shell-holding assemblies 79, 79', support a four-sided articulated shell 88 comprising front and rear shell halves 89, 90, respectively, which are hingedly secured to one another by pins 91 located in close proximity to the upper margins thereof. The upper margins of shell halves 89, 90, are bent outwardly in the provision of flanges 92 which are adapted to rest on the upper margin of shell-lifting bars 87 and support shell 88 thereon, while the rear side of shell half 90 is curved to conform with the curvature of cross bar 38 of upholstery-engaging assembly 29.

Cushion-assembling device A is provided with a pneumatic system including a plurality of pneumatic lines, valves, controls, and the like, all of which are conventional and therefore not described herein in detail. It is sufficient for purposes of the present disclosure to note that the pneumatic system actuates cylinders 19, 57, 72, and 81, as presently described and includes two hand-operated valves 110, 111, which are located on each side of work-supporting plate 24 and a foot-operated valve 112 located on the base plate 7.

As will be seen by reference to FIG. 9, cushion-assembling device A is adapted to tightly assemble or stuff a conventional cushion C of the type generally used for office furniture. Cushion C includes a rigid metal or other suitable base member 93 provided with a marginal inwardly struck rim 93' forming straight front and side margins and an arcuate rear margin which conforms substantially to the arcuate contour of cross bar 38 of upholstery-engaging assembly 29 and the rear side of shell half 90. Base member 93, which determines the peripheral shape of cushion C, supports a set of burlap-covered springs 94, and interposed between springs 94 and base member 93 is a sheet of felt 95. On its top side, that is to say the upwardly presented side when the cushion C is placed on a chair, springs 94 are covered with a layer of rubber-bonded hair 96 and over that is a covering of cotton or other suitable batting 97 which drapes down over the sides of springs 94. Felt 95, springs 94, rubber-bonded hair 96 and batting 97 are enclosed within a fabric, synthetic resin, or other suitable cover section 98 having a top section 99 which is sewn along a bead 100 to a side section 101. The bottom margin formed by top section 99 and side section 101 is provided with a peripheral bead 102 to which a perimetral flap 103 is also attached. The underface of base member 93 along the side and end margins thereof, as well as the inner face of flap 103, are coated with a latex pressure-sensitive adhesive which adhesively holds flap 103 securely to base member 93 in the formation of a unitary cushion structure which, in fact, is the cushion C.

Prior to placing the various components of cushion C in cushion-assembling device A, articulated shell 88 is bent along pins 91 so as to bring the bottom front and rear margins of shell halves 89, 90, into somewhat closer relation, whereupon shell 88 is fitted into cover section 98 and is thereafter straightened out so that the upper flanges of shell halves 89, 90, are substantially coplanar. When shell 88 is straightened to form a substantially rectangular structure, the side walls thereof are tightly embraced by the side portions of cover section 98. In this connection, it should be noted that shell 88 possesses a peripheral contour substantially identical to cushion C and, in fact, holds cover section 98 in proper shape while the remaining components of cushion C are placed therein. Thus, batting 97, rubber-bonded hair 96, burlap-covered springs 94, felt 95, and base member 93 are subsequently fitted into the cavity of shell 88 in the order illustrated in FIG. 9.

Thereafter, tubular shell 88 containing the various components of cushion C is manually fitted between connector bars 86 with the rear shell half 90 presented toward arcuate cross bar 38 and wiper bar 62 of upholstery-engaging assembly 29 and wiper assembly 48, respectively, shell 88 being subsequently slid rearwardly in an elevated position until rear shell half 90 abuts against stops 87', in which position its open center will be located directly below and in registration with pressure plate 75. Thereafter, shell 88 is manually lowered until its flanges 92 engage shell-lifting bars 87, in which position cross bars 38 and wiper bars 61 are located in slightly outwardly spaced surrounding relation to the depending sides of shell 88 and cover section 98 in engagement therewith. In this position the bottom margin of shell 88 and the top section 99 of cover section 98 are presented in close proximity to the upper surface of platen 25, but do not engage platen 25, as best seen in FIG. 11. It should be noted that shell 88 is supported on bars 87 so that shell halves 89, 90, extend transversely between shell-lifting assemblies 78, 79, and are supported by side flanges 92 thereof. This prevents shell 88 from articulating while supported in assembling device A. It should additionally be noted that the inner surface of flap 103 and outer face of base member 93 in close proximity to the peripheral margin thereof are coated with a pressure-sensitive adhesive.

Referring now to FIGS. 10 through 15, cushion-assembling device A performs the following assembly operations which have heretofore been accomplished by expensive and time-consuming manual labor. After the operator has placed shell 88 in position on shell-lifting bars 87 he depresses foot-operated valve 112, causing compressed air to enter cylinder 72 and extend piston rod 73, thereby bringing pressure plate 75 into engagement with base member 93 located within shell 88. Pressure plate 75 continues its downward movement urging top section 99 of cover section 98 against platen 25 and compressing batting 98, rubber-bonded hair 96, and springs 94 tightly together within shell 88 and cover section 98, the downward movement of plate 75 terminating when stop nuts 76' engage the upper surface of frame 67'. At this point, cover section 98 will have been slid partially off of shell 88, and rim 93' of base member 93 will be presented at peripheral bead 102. Thereafter, a suitable type of valve within the pneumatic system directs compressed air to cylinders 81 of shell-lifting assemblies 79, 79', causing them to retract and lift bars 87 to withdraw shell 88 from cover section 98. Inasmuch as cover section 98 frictionally embraces the depending sides of shell 88, this withdrawal tends to draw the front portion of top section 99 and side section 101 taut over the sides of the remaining compressed components of cushion C. At this point, if necessary, the operator can manipulate any of the free portions of cushion C, such as flap 103, to insure that they are aligned correctly for subsequent use, although it is important to note that this is rarely necessary.

Figure 14:
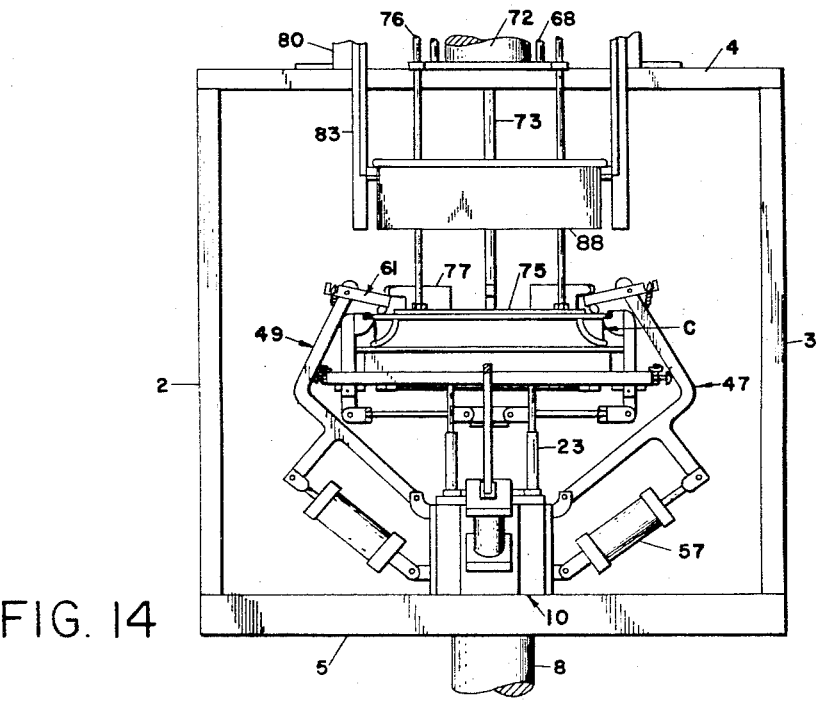
Figure 15:
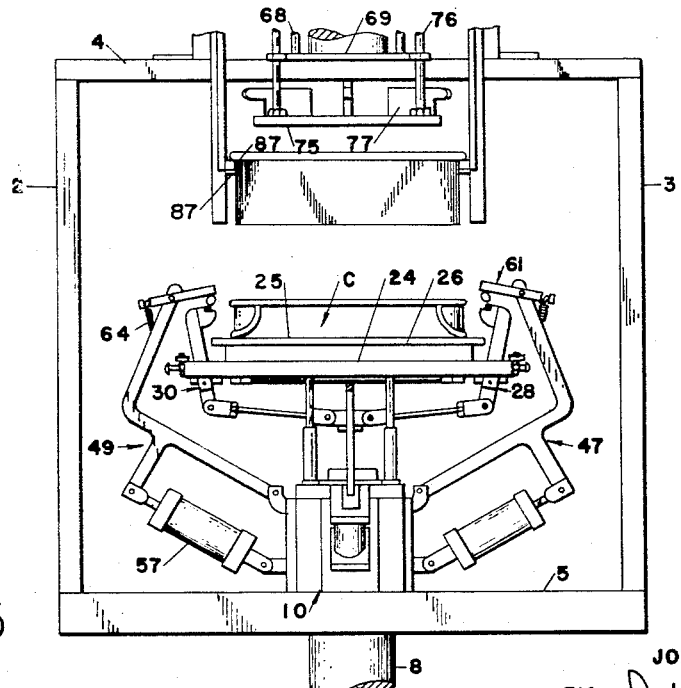

Next, the operator simultaneously depresses hand-operated valves 110, 111, thereby energizing cylinder 19 and forcing piston rod 20 and hub 21 upwardly. It has previously been noted that as hub 21 moves upwardly linkages 40 of upholstery-engaging assemblies 27, 28, 29, 30, move from an angulated position to a horizontal position, thereby forcing lever arms 37 outwardly and cross bars 38 inwardly. Grooves 39 of the inwardly moving cross bars 38 engage peripheral bead 102 of cover section 98 and firmly hold it against outer rim 93' of base member 93, as best seen in FIG. 14. A suitable time-delay valve forming part of the pneumatic system immediately thereafter actuates wiper assemblies 46, 47, 48, and 49, by directing compressed air to cylinders 57 thereof. As piston rods 59 extend from cylinders 57, angulated arms 53 rotate upwardly and carry wiper bars 62 and bifurcated wiper arms 61 over cross bars 38 where top surface wiper arms 61 engage rollers 77' of camming blocks 77 which cam wiper bars 62 down against flap 103. Continued inward movement of bars 62 wipe adhesive coated flap 103 against the adhesive covered upper surface of base member 93, causing the two to tightly adhere one to the other.

When the operator removes his hands from valves 110, 111, compressed air is directed to the opposite ends of cylinders 57 of wiper assemblies 46, 47, 48, 49, causing them to withdraw their wiper bars 62 across the adhesively-secured flap 103 and move outwardly to their original position beyond the peripheral margin of cushion C. Immediately thereafter air is directed to the opposite end of cylinder 19, causing it to move grooved cross bars 38 outwardly and away from engagement with peripheral bead 102 of cover section 98. Subsequently, by means of a suitable time-delay forming part of the pneumatic system, cylinder 72 withdraws pressure plate 75 from cushion C and immediately thereafter cylinder 81 lowers shell-lifting bars 87 and shell 88 to their original position, thus completing the cycle. Cushion C is removed for installation on a chair while articulated shell 88 can be reused in assembling another cushion C.

It should be noted that cushion-assembling device A can accommodate cushions of various thicknesses merely by altering the thickness of spacer element 26 which is interposed between platen 25 and work-supporting surface 24.

Inasmuch as valves 110, 111, are located on opposite sides of plate 24 and must be depressed simultaneously and held in that position before upholstery-engaging assemblies 27, 28, 29, 30, and wiper assemblies 46, 47, 48 49, will move, both of the operator's hands are occupied when such assemblies, cross bars 38, and wiper bars 62 move inwardly and he cannot be injured thereby.

Cushion-assembling device A provides a tightly stuffed, attractively contoured cushion C with the expenditure of a minimum amount of manual labor and time. The only manual labor necessary is employed in filling shell 88 which involves little effort and skill. More particularly, it has been found through actual experience that cushion-assembling device A assembles cushion C in about one-half minute, whereas manual assembling operations require 15 to 20 minutes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A device for assembling furniture cushions including a rigid base member, resilient means, and a cavity-forming cover section sized and shaped to hold the resilient means and base member together in a unitary structure, the cover section having an opening sized and shaped to receive the resilient means and base member; said device comprising a frame; a platen support carried by the frame for supporting the cover section with the resilient means and base member therein, the base member being fitted over the resilient means so as to be presented outwardly, a press assembly carried by the frame in outwardly spaced relation to the platen for engaging the base member and urging it into the cover section to compress the resilient means and cause a portion of the cover section to project outwardly beyond the base member, and securing means for securing the cover section to the base member after the press assembly compresses the resilient means within the cover section, said securing means including a plurality of wiper bars carried by the frame for engaging the outwardly projecting portion of the cover section and pressing it firmly against the base member so that when an adhesive is interposed between the outwardly projecting portion of the cover section and base member the two will adhere together so that the cover section and base member in combination substantially envelop the resilient means.

2. A device according to claim 1 in which the press assembly includes a pressure plate adapted to move toward the platen for engagement with the base member of the unassembled cushion, and camming means carried by the pressure plate for camming the wiper bars into engagement with the outwardly projecting portions of the cover section.

3. A device for assembling furniture cushions including a rigid base member, resilient means, and a cavity-forming cover section sized and shaped to hold the resilient means and base member together in a unitary structure, the cover section having an opening sized and shaped to receive the resilient means and base member; said device comprising a frame; a platen support carried by the frame for supporting the cover section with the resilient means and base member therein, the base member being fitted over the resilient means so as to be presented outwardly, a press assembly carried by the frame in outwardly spaced relation to the platen for engaging the base member and urging it into the cover section to compress the resilient means, the press assembly including a pressure plate above the platen adapted to move into and away from engagement with the base member, a shell sized for insertion in the cover section for holding it in relation to the resilient means and base member while the pressure plate engages the base member, the shell being removable from the frame for assembling the resilient means and base member into the cover section, and means for securing the cover section to the base member after the press assembly has compressed the resilient means and base member in the cover section.

4. A device according to claim 3 and further characterized by a shell-lifting assembly carried by the frame and adapted to engage the shell and move it from a first position in close proximity to the platen to a second position wherein it is withdrawn from the vicinity of the platen, the shell-lifting assembly being in the first position when the pressure plate initially engages the base member, the shell-lifting assembly being adapted to move to the second position and withdraw the shell from the cover section while the pressure plate remains in engagement with the base member.

5. A device according to claim 4 and further characterized by upholstery-engaging means for holding the sides of the cover section in a predetermined position above the platen as the means for securing the cover section to the base member acts upon the cover section.

6. A device according to claim 5 in which the pressure plate urges the base member into the cover section beyond the margins of the opening so that a portion of the cover section projects upwardly beyond the base member when the pressure plate is in the extended position; and in which the means for securing the cover section comprise wiping means carried by the frame for engaging the outwardly projecting portion of the cover section while the pressure plate remains in the extended position so that when an adhesive is interposed between the outwardly projecting portion of the cover section and the base member, the two will adhere one to the other whereby the cover section and base member together envelop the resilient means in the formation of an assembled cushion.

7. A device according to claim 6 in which the wiping means includes a plurality of wiper bars adapted to move over the platen and inwardly past the perimetral margin of the base member after the shell-lifting means has moved to the second position and withdrawn the shell from the cover section, the bars being adapted to engage the outwardly projecting portion of the cover section and press it tightly against the base member.

8. A device for assembling seat cushions according to claim 6 in which the shell is provided with outwardly projecting flanges and the shell-lifting assembly is provided with horizontal bars which receive the flanges of the shell whereby to support the shell in spaced relation above the platen.

9. A device for assembling seat cushions with a minimum amount of manual skill and effort from component elements including a rigid base member, resilient means, and a cavity-forming cover section sized and shaped to hold the resilient means and base member together in a unitary structure, the cover section being provided on its sides with a peripheral bead and having flaps projecting beyond the bead; said device comprising a removable tubular shell having outwardly projecting flanges, the shell being externally sized and adapted for insertion within the cover section so that the sides of the cover section are in snug embracing relation with the sides of the shell, the shell being internally sized and shaped to receive the resilient means and base member with the base member presented outwardly, a frame, a horizontal platen carried by the frame, a shell-lifting assembly carried by the frame and having horizontal lifting bars presented above the platen which are adapted to engage the flanges of the shell whereby to support the shell in spaced relation above the platen, the shell-lifting assembly being adapted to move the shell from a raised position in upwardly spaced relation to the platen to a lower position in close proximity to the platen, a press assembly carried by the frame and including a pressure plate interposed between the planes defined by the movement of the lifting bars, the pressure plate being adapted to move from a retracted position wherein it is presented above the shell when the lifting bars are in the lower position to an extended position wherein it engages the base member within the shell and urges the resilient means and base member into the cover section, the outer surface of the base member being slightly below the flaps when the pressure plate is in the fully extended position, an upholstery-engaging means provided with cross bars having longitudinally extending grooves located in registration with and sized for reception of the peripheral bead, the cross bars being adapted to move from an outer position to an inner position wherein the grooves engage the peripheral bead so as to hold the unassembled cushion in a fixed position on the platen, and wiping means including wiping bars presented above the cross bars and adapted to move from an outer position to an inner position where they engage the flap and wipe it tightly against the base member whereby when an adhesive is interposed between the flap and the base member the flap will adhere tightly thereto, the shell-lifting assembly being adapted to move to the retracted position and thereby withdraw the shell from the cover section while the pressure plate remains in the extended position, but before the wiper assembly moves the wiper bars from the outer position to the inner position.

10. A device for assembling seat cushions according to claim 9 and further characterized by camming means operatively associated with the pressure plate for camming the wiper bars into engagement with the flap so as to force the flap into engagement with the outer surface of the base member.

11. A device for assembling seat cushions according to claim 9 in which the shell includes two shell halves each having side flanges projecting outwardly from their upper margins, the flanges being adapted to rest on the lifting bars, the shell halves being hingedly joined in close proximity to their upper margins whereby the shell can be bent for easy insertion in the cover section.

References Cited

UNITED STATES PATENTS

| 102,212 | 4/1870 | Bingham | 29—91.5 |
| 1,546,689 | 7/1925 | Verwys | 29—91.5 |
| 1,590,135 | 6/1926 | Upham | 29—91.1 |
| 3,094,716 | 6/1963 | Friedman | 156—229 |
| 3,270,394 | 9/1966 | Marsh et al. | 29—91.5 X |

THOMAS H. EAGER, *Primary Examiner.*

U.S. Cl. X.R.

29—448; 156—229